United States Patent
Fujimura et al.

(10) Patent No.: US 11,111,820 B2
(45) Date of Patent: Sep. 7, 2021

(54) GAS TURBINE FOR AIRCRAFT

(71) Applicant: MITSUBISHI HEAVY INDUSTRIES AERO ENGINES, LTD., Komaki (JP)

(72) Inventors: Daigo Fujimura, Tokyo (JP); Hiroshi Watanabe, Tokyo (JP); Tadayuki Hanada, Komaki (JP); Takaaki Hase, Komaki (JP)

(73) Assignee: MITSUBISHI HEAVY INDUSTRIES AERO ENGINES, LTD., Komaki (JP)

( * ) Notice: Subject to any disclaimer, the term of this patent is extended or adjusted under 35 U.S.C. 154(b) by 0 days.

(21) Appl. No.: 17/042,446

(22) PCT Filed: Dec. 26, 2018

(86) PCT No.: PCT/JP2018/047810
§ 371 (c)(1),
(2) Date: Sep. 28, 2020

(87) PCT Pub. No.: WO2019/187435
PCT Pub. Date: Oct. 3, 2019

(65) Prior Publication Data
US 2021/0079811 A1 Mar. 18, 2021

(30) Foreign Application Priority Data

Mar. 30, 2018 (JP) .............................. JP2018-067827

(51) Int. Cl.
*F01D 25/24* (2006.01)
*B64D 27/10* (2006.01)
(Continued)

(52) U.S. Cl.
CPC ............. *F01D 25/24* (2013.01); *B64D 27/10* (2013.01); *F01D 5/02* (2013.01); *F01D 9/02* (2013.01);
(Continued)

(58) Field of Classification Search
CPC ... F01D 9/02; F01D 9/04; F01D 9/041; F01D 11/08; F01D 25/246
See application file for complete search history.

(56) References Cited

U.S. PATENT DOCUMENTS

| | | | |
|---|---|---|---|
| 5,188,507 A | 2/1993 | Sweeney | |
| 6,099,248 A * | 8/2000 | Mumm | F01D 5/141 |
| | | | 415/192 |

(Continued)

FOREIGN PATENT DOCUMENTS

| | | |
|---|---|---|
| JP | H05-240066 A | 9/1993 |
| JP | 2013-221512 A | 10/2013 |
| WO | 2017/195782 A1 | 11/2017 |

OTHER PUBLICATIONS

PCT/ISA/210, "International Search Report for International Application No. PCT/JP2018/047810," dated Mar. 26, 2019.

(Continued)

*Primary Examiner* — J. Todd Newton
*Assistant Examiner* — Cameron A Corday
(74) *Attorney, Agent, or Firm* — Manabu Kanesaka; Benjamin Hauptman; Kenneth Berner

(57) ABSTRACT

A gas turbine for an aircraft includes: blades each including a blade body extending outward from a rotor rotating about an axis in a radial direction of the rotor and a fin protruding from an outer peripheral surface of a blade shroud formed on a distal end of the blade body; a casing installed to form gaps between the casing and the fins; and vanes each including a vane shroud formed such that at least a leading end portion of the vane shroud formed upstream in an axial direction is located outside with respect to an extended line of an inner peripheral surface of the casing in the radial direction.

3 Claims, 3 Drawing Sheets

(51) Int. Cl.
*F01D 5/02* (2006.01)
*F01D 9/02* (2006.01)
(52) U.S. Cl.
CPC ...... *F05D 2220/32* (2013.01); *F05D 2240/12* (2013.01); *F05D 2240/24* (2013.01)

(56) References Cited

U.S. PATENT DOCUMENTS

| | | | |
|---|---|---|---|
| 2009/0010758 A1* | 1/2009 | Wunderlich | F01D 11/08 |
| | | | 415/214.1 |
| 2013/0272888 A1 | 10/2013 | Chouhan et al. | |
| 2016/0222824 A1* | 8/2016 | Gersbach | F01D 9/041 |
| 2020/0148325 A1* | 5/2020 | Gea Aguilera | B64C 21/10 |
| 2020/0355085 A1* | 11/2020 | Lemarchand | F04D 29/544 |

OTHER PUBLICATIONS

PCT/ISA/237, "Written Opinion of the International Searching Authority for International Application No. PCT/JP2018/047810," dated Mar. 26, 2019.

* cited by examiner

GAS TURBINE FOR AIRCRAFT

TECHNICAL FIELD

The present invention relates to a gas turbine for an aircraft.

Priority is claimed on Japanese Patent Application No. 2018-067827, filed Mar. 30, 2018, the content of which is incorporated herein by reference.

BACKGROUND ART

In a gas turbine for an aircraft, a part of a main flow of a combustion gas does not pass through a blade, but passes through a gap between a blade tip and a housing. The combustion gas passing through the gap may flow to a back surface side of a vane disposed on the downstream side of the blade and generate a secondary flow in a direction different from the main flow in the back surface of the vane. This secondary flow increases pressure loss in the vane.

Patent Document 1 proposes a technique of reducing secondary flow loss due to a secondary flow flowing along a back surface of a vane by forming a leading edge curved portion on a tip side of a leading edge of the vane to recede toward an axial downstream side and protrude toward an axial upstream side.

CITATION LIST

Patent Document(s)

Patent Document 1: International Publication No. WO 2017/195782

SUMMARY OF INVENTION

Technical Problem

In Patent Document 1, in order to reduce loss, a turbine blade without a shroud on a tip side is essential. In the case of a shroud blade having a shroud on a tip side, the mechanism of the secondary flow loss of the vane on the downstream side of the shroud blade is different from that of the secondary flow loss of Patent Document 1.

In many cases, the shroud blade includes fins that reduce a clearance flow passing between the shroud and the casing. However, a gap is formed between the fin and the casing. Therefore, the clearance flow passing through this gap flows along an inner peripheral surface of the casing toward the downstream side. This clearance flow collides with the shroud of the vane disposed on the downstream side and joins a main flow. Since this clearance flow joins the main flow, the direction of the main flow may be disturbed and pressure loss may be generated in the vane in some cases.

An object of the present invention is to provide a gas turbine for an aircraft capable of reducing pressure loss.

Solution to Problem

According to a first aspect of the invention, a gas turbine for an aircraft includes: a rotor which is capable of rotating about an axis; blades each including a blade body extending outward from the rotor in a radial direction of the rotor, a blade shroud formed on a distal end of the blade body, and a fin protruding from an outer peripheral surface of the blade shroud; a casing surrounding the rotor and the blades so as to form gaps between the casing and the fins; and vanes each including a vane shroud fixed to the casing at a downstream side of the blade in an axial direction of the axis, of which at least a leading end portion formed upstream in the axial direction is located outside with respect to a first extended line of an inner peripheral surface of the casing in the radial direction about the axis, and a vane body extending inward from the vane shroud in the radial direction.

In the first aspect, the leading end portion of the vane shroud is located outside with respect to the first extended line of the inner peripheral surface of the casing in the radial direction. Therefore, a clearance flow which flows downstream from the gap between the fin and the casing in the axial direction joins a main flow without colliding with the leading end portion of the vane shroud. Therefore, it is possible to reduce pressure loss of the vane.

According to a second aspect of the invention, in the gas turbine for the aircraft according to the first aspect, a leading edge of the vane body formed upstream in the axial direction may include: a receding start point; a radial outer end portion which is connected to the vane shroud and is receded downstream in the axial direction with respect to the receding start point; and a leading edge curved portion which is formed to connect the receding start point and the radial outer end portion and which is arched upstream in the axial direction.

With such a configuration, the clearance flow flowing between the fin and the casing flows in the axial direction and collides with the leading edge curved portion of the leading edge of the vane. A part close to the vane shroud in the leading edge curved portion is receded downstream in the axial direction as it approaches the radial outer end portion. As a result, the colliding position of the clearance flow can be shifted to the ventral side of the vane body portion. Therefore, it is possible to suppress a secondary flow from being generated on the back surface side of the vane body portion.

According to a third aspect of the invention, the receding start point according to the second aspect may be located outside a rear end of an inner surface of the blade shroud in the radial direction.

With such a configuration, the leading edge curved portion can be positioned outside with respect to the receding start point in the radial direction. Therefore, it is possible to suppress loss when a part of the main flow flows to a portion where the leading edge curved portion is formed.

According to a fourth aspect of the invention, the vane shroud according to any one of the first to third aspects may include: a shroud main body portion which is fixed to the casing; and a leading edge fillet portion which is formed between the shroud main body portion and the radial outer end portion of the vane body and is formed so as to be gradually spread toward at least upstream in the axial direction as it approaches the shroud main body portion, and a distance between the blade shroud and the shroud main body portion in the radial direction may be larger than a sum of a length of the leading edge fillet portion in the radial direction and a distance between the blade shroud and the casing in the radial direction.

In the fourth aspect, the leading edge fillet portion of the vane shroud is located outside with respect to the clearance flow in the radial direction. Therefore, it is possible to suppress the clearance flow from colliding with the leading edge fillet portion that spreads to the axial upstream side. Accordingly, it is possible to suppress the clearance flow from colliding with the leading edge fillet portion so that the colliding position of the clearance flow is shifted to the back surface side of the vane. Thus, it is possible to suppress the generation of the secondary flow.

According to a fifth aspect of the invention, the blade shroud according to any one aspect of the first to fourth aspects may be installed at a flare angle so as to be separated from the axis as it approaches downstream in the axial direction, the casing may include an inclined surface which is formed downstream the gap in the axial direction and which has at an angle corresponding to the flare angle, and the leading end portion of the vane shroud formed upstream in the axial direction may be located outside with respect to a second extended line of the inclined surface in the radial direction.

With such a configuration, the clearance flow can flow along the inclined surface having an angle corresponding to the flare angle of the blade shroud. Accordingly, the clearance flow can be brought closer to the tip side of the vane. Then, an angle at which the clearance flow flows can be closer to an angle of the main flow flowing along the blade shroud. Therefore, it is possible to relax an angle at which the clearance flow collides with the main flow. As a result, it is possible to reduce pressure loss due to the collision between the clearance flow and the main flow.

Advantageous Effects of Invention

According to the gas turbine for the aircraft, it is possible to reduce pressure loss.

DESCRIPTION OF EMBODIMENTS

First Embodiment

Next, a gas turbine for an aircraft of a first embodiment of the invention will be described with reference to the drawings.

Figure 1:
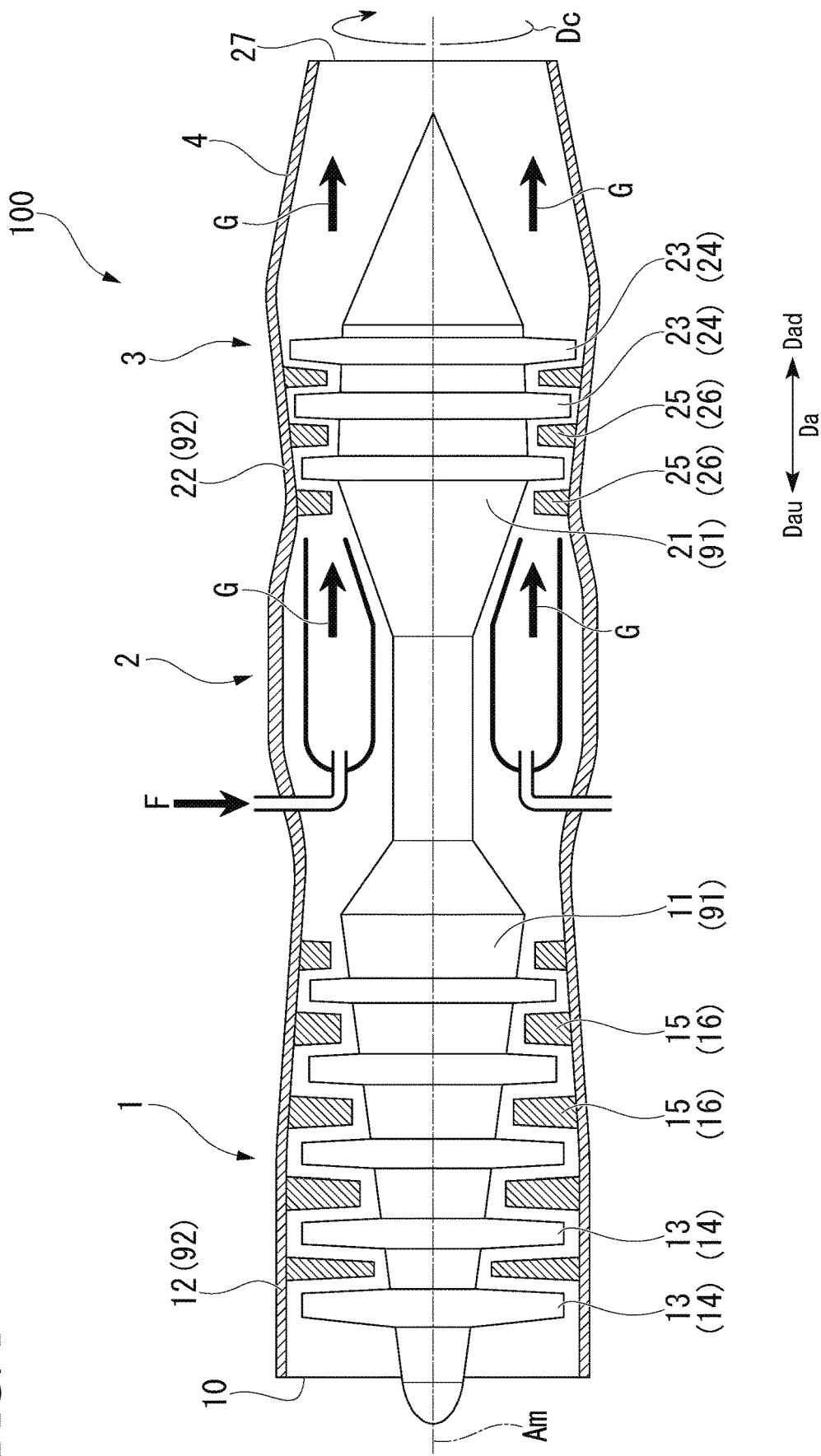
FIG. 1 is a configuration diagram showing a schematic configuration of a gas turbine for an aircraft of an embodiment of the invention.

FIG. 1 is a configuration diagram showing a schematic configuration of the gas turbine for the aircraft of the embodiment of the invention.

A gas turbine 100 for an aircraft according to the first embodiment is for obtaining thrust of an aircraft. As shown in FIG. 1, the gas turbine 100 mainly includes a compressor 1, a combustion chamber 2, and a turbine 3.

The compressor 1 generates high-pressure air by compressing air taken in from an intake duct 10. The compressor 1 includes a compressor rotor 11 and a compressor casing 12. The compressor casing 12 covers the compressor rotor 11 from the outer peripheral side and extends in an extension direction of an axis Am (hereinafter referred to as an axial direction Da).

A plurality of compressor blade rows 13 are provided in an outer peripheral surface of the compressor rotor 11 to be arranged at intervals in the axial direction Da. These compressor blade rows 13 each include a plurality of compressor blades 14. The compressor blades 14 of each compressor blade row 13 are arranged on the outer peripheral surface of the compressor rotor 11 at intervals in a circumferential direction Dc of the axis Am.

A plurality of compressor vane rows 15 are provided in an inner peripheral surface of the compressor casing 12 to be arranged at intervals in the axial direction Da. These compressor vane rows 15 are arranged alternately with the compressor blade rows 13 in the axial direction Da. These compressor vane rows 15 each include a plurality of compressor vanes 16. The compressor vanes 16 of each compressor vane row 15 are arranged on the inner peripheral surface of the compressor casing 12 at intervals in the circumferential direction Dc of the axis Am.

The combustion chamber 2 generates a combustion gas G by mixing high-pressure air generated by the compressor 1 with fuel F and burning the mixture. The combustion chamber 2 is provided between the compressor casing 12 and a turbine casing (casing) 22 of the turbine 3. The combustion gas G generated by the combustion chamber 2 is supplied to the turbine 3.

The turbine 3 is driven by the high-temperature and high-pressure combustion gas G generated by the combustion chamber 2. More specifically, the turbine 3 expands the high-temperature and high-pressure combustion gas G and converts the thermal energy of the combustion gas G into rotational energy. The turbine 3 includes a turbine rotor 21 and a turbine casing 22.

The turbine rotor 21 extends in the axial direction Da. A plurality of turbine blade rows 23 are provided in an outer peripheral surface of the turbine rotor 21 to be arranged at intervals in the axial direction Da. These turbine blade rows 23 each include a plurality of turbine blades 24. The turbine blades 24 of each turbine blade row 23 are arranged on the outer peripheral surface of the turbine rotor 21 at intervals in the circumferential direction Dc of the axis Am.

The turbine casing 22 covers the turbine rotor 21 from the outer peripheral side. A plurality of turbine vane rows 25 are provided in an inner peripheral surface of the turbine casing 22 to be arranged at intervals in the direction of the axis Am. The turbine vane rows 25 are arranged alternately with the turbine blade rows 23 in the direction of the axis Am. These turbine vane rows 25 each include a plurality of turbine vanes 26. The turbine vanes 26 of each turbine vane row 25 are arranged in the inner peripheral surface of the turbine casing 22 at intervals in the circumferential direction Dc of the axis Am.

The compressor rotor 11 and the turbine rotor 21 are integrally connected to each other in the axial direction Da. A gas turbine rotor 91 is constituted by the compressor rotor 11 and the turbine rotor 21. Similarly, the compressor casing 12 and the turbine casing 22 are integrally connected to each other along the axis Am. A gas turbine casing 92 is constituted by the compressor casing 12 and the turbine casing 22.

The gas turbine rotor 91 is integrally rotatable inside the gas turbine casing 92 about the axis Am.

When the gas turbine 100 for the aircraft with the above-described configuration is operated, the compressor rotor 11 (gas turbine rotor 91) is first rotationally driven by an external drive source. External air is sequentially compressed with the rotation of the compressor rotor 11 so that high-pressure air is generated. This high-pressure air is supplied into the combustion chamber 2 through the compressor casing 12. Inside the combustion chamber 2, fuel is mixed with this high-pressure air and is then burned so that a high-temperature and high-pressure combustion gas is generated. The combustion gas is supplied into the turbine 3 through the turbine casing 22.

Inside the turbine 3, a combustion gas sequentially collides with the turbine blade row 23 and the turbine vane row 25 so that a rotational drive force is applied to the turbine rotor 21 (the gas turbine rotor 91). This rotational energy is mainly used to drive the compressor 1. The flow velocity of the combustion gas G having driven the turbine 3 is increased by an exhaust nozzle 4 so that the combustion gas becomes a jet that produces a thrust and the jet is discharged from the injection port 27 to the outside. Further, in this embodiment, a single-axis turbojet engine has been described as an example of the gas turbine for the aircraft. However, the present invention is not limited to the single-axis turbojet engine and may have any form as long as the gas turbine for the aircraft is used.

Figure 2:
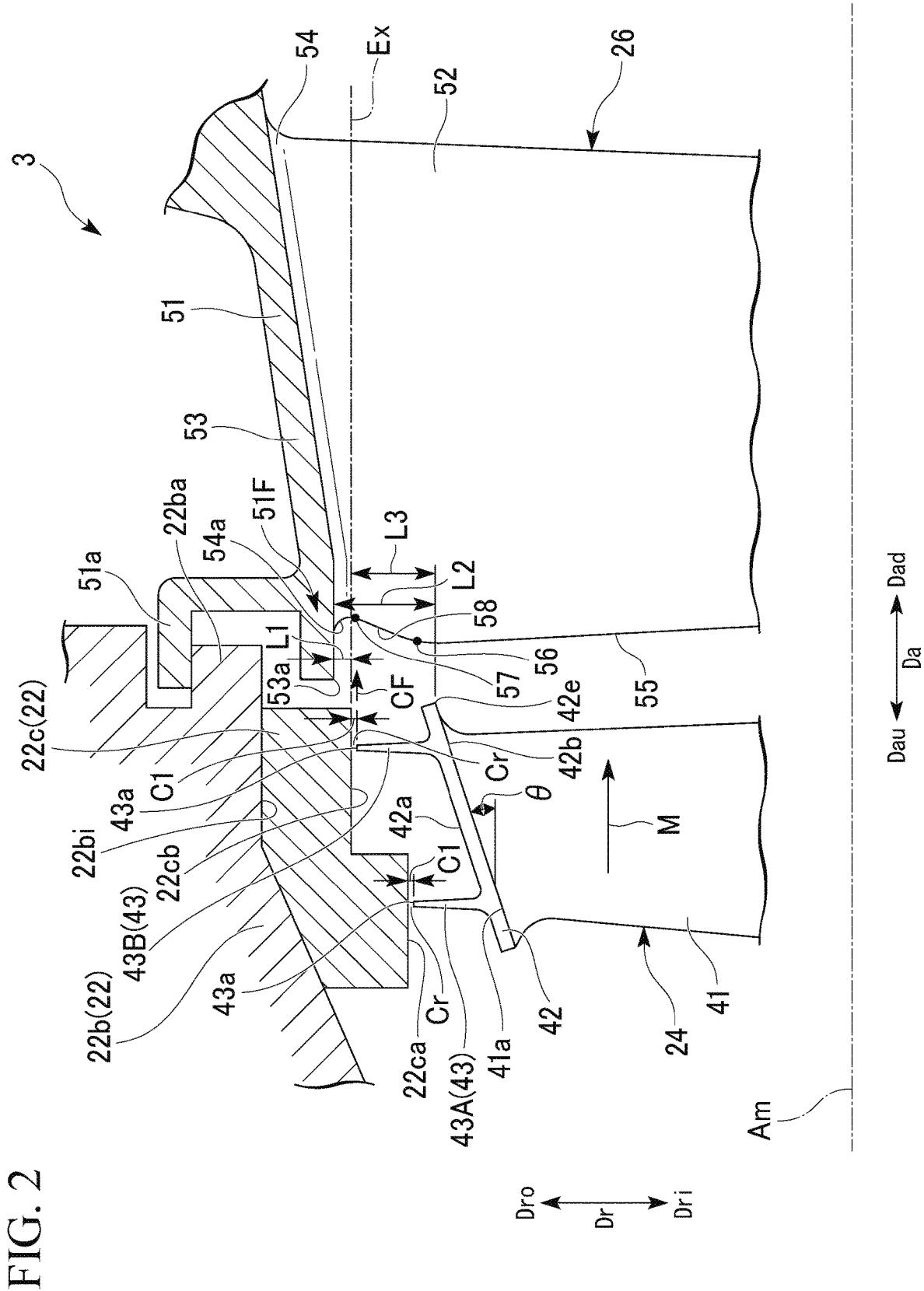
FIG. 2 is a partially enlarged cross-sectional view of the vicinity of an end portion of a blade of a first embodiment of the invention.

FIG. 2 is a partially enlarged cross-sectional view of the vicinity of the end portion of the blade of the first embodiment of the invention.

As shown in FIG. 2, the turbine blade 24 of the turbine 3 includes a blade body 41, a blade shroud 42, and fins 43. The blade body 41 extends outward from the turbine rotor 21 (see FIG. 1) in the radial direction. The blade shroud 42 is provided in a distal end 41a of the blade body 41, more specifically, the distal end 41a of the blade body 41 on the outside of the radial direction Dr about the axis Am (hereinafter, simply referred to as a radial outer side Dro). The blade shroud 42 is formed in all distal ends 41a of the turbine blades 24 arranged in the circumferential direction De (see FIG. 1) about the axis Am. These blade shrouds 42 are formed in a ring shape by arranging the blade shrouds 42 of the turbine blades 24 adjacent to each other in the circumferential direction Dc to be adjacent to each other. Additionally, the blade shrouds 42 may be integrally formed with each other in the circumferential direction Dc.

The blade shroud 42 shown in FIG. 2 is inclined at a predetermined flare angle θ to be disposed on the outside in the radial direction Dr as it approaches a downstream side of a main flow M with respect to the axis Am (hereinafter, simply referred to as an axial downstream side Dad). The flare angle θ is an angle with respect to the axis Am. The main flow M flowing in the vicinity of the blade shroud 42 flows along the blade shroud 42. That is, the main flow M flows away from the axis Am (in other words, toward the outside in the radial direction Dr) as it approaches the axial downstream side Dad.

The fins 43 protrude from the outer peripheral surface 42a of the blade shroud 42. The two fins 43 exemplified in this embodiment are provided at intervals in the axial direction Da. Additionally, in the following description, the two fins 43 are referred to as a fin 43A and a fin 43B.

The fin 43A and the fin 43B extend to close a gap between the turbine blade 24 and the turbine casing 22 on the outside of the turbine blade 24 in the radial direction Dr. Further, these fins 43A and 43B are provided for each turbine blade 24 similarly to the blade shroud 42. The fins 43A and 43B are formed in a continuous ring shape in the circumferential direction Dc by disposing the fin 43A and the fin 43B of the adjacent turbine blades 24 in the circumferential direction Dc to be adjacent to each other.

A tip end 43a of each of the fins 43A and 43B is disposed with a slight clearance C1 with respect to the inner peripheral surface of the turbine casing 22 (more specifically, inner peripheral surfaces 22ca and 22cb of a damper seal 22c). These clearances C1 are formed as small as possible, for example, in a range in which they do not come in contact with the inner peripheral surface of the turbine casing 22 due to thermal deformation or vibration. The fins 43A and 43B which are exemplified in this embodiment extend in a direction substantially perpendicular to the axis Am. However, the inclination angles of the fins 43A and 43B with respect to the axis Am are not limited to the perpendicular direction. Further, the number of the fins 43 is not limited to two. For example, the number of the fins 43 may be one or three or more.

The turbine casing 22 includes a casing main body (not shown), a blade ring (not shown), a heat shield ring (not shown), a split ring 22b, and the damper seal 22c. The casing main body (not shown) is formed in a cylindrical shape that covers the turbine rotor 21 and the turbine blade 24 from the outer peripheral side and supports the blade ring (not shown) on the inner peripheral side. The blade ring (not shown) is formed in a ring shape about the axis Am. The blade ring is disposed on the radial outer side Dro of the plurality of split rings 22b and the turbine vane 26. The heat shield ring (not shown) is disposed between the blade ring (not shown) and the split ring 22b and between the blade ring (not shown) and the turbine vane 26 in the radial direction Dr. The heat shield ring connects the blade ring (not shown) to the split ring 22b and connects the blade ring (not shown) to the turbine vane 26.

The damper seal 22c suppresses a part of the main flow M from passing through each of gaps Cr formed between the fin 43A and the turbine casing 22 and between the fin 43B and the turbine casing 22. The damper seal 22c of this embodiment constitutes a non-contact seal structure together with the fins 43A and 43B. This damper seal 22c is fixed to an inner peripheral surface 22bi of the split ring 22b. As the damper seal 22c, for example, a member having a honeycomb structure opening to the inside in the radial direction Dr about the axis Am (hereinafter, simply referred to as a radial inner side Dri) can be used. Further, an abradable seal or the like can be used as the damper seal 22c.

The damper seal 22c exemplified herein includes two inner peripheral surfaces 22ca and 22cb respectively facing the tip ends 43a of the fins 43A and 43B. These inner peripheral surfaces 22ca and 22cb constitute the inner peripheral surface of the turbine casing 22 at a position where the damper seal 22c is disposed. FIG. 2 shows a case in which the gap Cr between the inner peripheral surface 22ca of the damper seal 22c and the fin 43A and the gap Cr between the inner peripheral surface 22cb and the fin 43 are formed as the same clearance C1.

The inner peripheral surfaces 22ca and 22cb of the damper seal 22c of this embodiment are each formed in parallel to the axis Am and the positions in the radial direction Dr are different. Accordingly, the inner peripheral surface of the damper seal 22c is formed in a step shape. Additionally, the shape of the damper seal 22c is not limited to the shape in the embodiment. The damper seal 22c need only be provided when necessary. For the damper seal 22c, for example, the damper seal 22c of the turbine casing 22 may be omitted and the tip ends 43a of the fins 43A and 43B may be disposed to face the inner peripheral surface 22bi of the split ring 22b.

The turbine vane 26 is fixed to the turbine casing 22 on the axial downstream side Dad of the turbine blade 24. The turbine vane 26 includes at least a vane shroud 51 and a vane body 52.

The vane shroud 51 is disposed on the axial downstream side Dad with respect to the turbine blade 24 and is fixed to the turbine casing 22. The vane shroud 51 includes a shroud main body portion 53 and a fillet portion 54.

The shroud main body portion 53 is formed in a cylindrical shape about the axis Am and extends in the flow direction of the main flow M. The shroud main body portion 53 includes a hook portion 51a formed at the end portion on the upstream side of the axial direction where the main flow M flows (hereinafter, simply referred to as an axial upstream side Dau). The vane shroud 51 is fixed to a downstream end portion 22ba of the split ring 22b by the hook portion 51a. The flow passage of the main flow M is formed on the radial inner side Dri of the shroud main body portion 53 disposed in a cylindrical shape.

The fillet portion 54 is formed between the shroud main body portion 53 and the end portion of the vane body 52 on the radial outer side Dro. The fillet portion 54 smoothly connects a corner portion where the vane body 52 and the shroud main body portion 53 intersect each other along a concave curved surface. In a cross-section intersecting the blade height direction of the vane body 52, the cross-sectional contour of the fillet portion 54 is formed to gradually spread as it approaches the shroud main body portion 53.

The fillet portion 54 includes a leading edge fillet portion 54a on the axial upstream side. The cross-sectional contour of the leading edge fillet portion 54a may be formed to gradually spread toward the axial upstream side Dau at it approaches at least the shroud main body portion 53. A length L1 of the leading edge fillet portion 54a in the blade height direction of the vane body 52 is set according to the strength or the like required for the leading edge fillet portion 54a. Additionally, the length L1 of the leading edge fillet portion 54a can also be described as a distance between the end portion of the vane body 52 on the radial outer side Dro and the inner peripheral surface of the shroud main body portion 53. A case in which the cross-sectional contour of the leading edge fillet portion 54a gradually spreads as it approaches the shroud main body portion 53 has been described. The enlargement ratio of the cross-sectional contour is also set according to the strength or the like required for the leading edge fillet portion 54a.

In the vane shroud 51, at least a leading end portion 51F on the axial upstream side Dau is located on the radial outer side Dro with respect to an extended line Ex of the inner peripheral surface 22cb of the damper seal 22c corresponding to the inner peripheral surface of the turbine casing 22. In this embodiment, a portion located at the end portion on the axial upstream side Dau in the shroud main body portion 53 and the fillet portion 54 constituting the vane shroud 51 is located on the radial outer side Dro with respect to the extended line Ex of the inner peripheral surface 22cb of the damper seal 22c. A distance L2 between the blade shroud 42 and the shroud main body portion 53 of the vane shroud 51 in the radial direction Dr is larger than a sum (L1+L3) of the length L of the leading edge fillet portion 54a in the radial direction Dr and a distance L3 between the blade shroud 42 and the turbine casing 22 in the radial direction Dr.

The vane body 52 extends from the vane shroud 51 toward the radial inner side Dri. In the vane body 52, a leading edge 55 on the axial upstream side Dau is provided with at least a receding start point 56, a radial outer end portion 57, and a leading edge curved portion 58. The receding start point 56 is disposed on the outside with respect to a downstream end (a rear end of an inner surface) 42e of an inner peripheral surface 42b of the blade shroud 42 in the radial direction Dr. The radial outer end portion 57 is connected to the vane shroud 51 and is receded downstream in the axial direction with respect to the receding start point 56. The leading edge curved portion 58 is formed to connect the receding start point 56 and the radial outer end portion 57 to each other, and has a curved shape to be arched upstream in the axial direction.

In the gas turbine for the aircraft of the first embodiment, the inner peripheral surface of the vane shroud 51 is located on the radial outer side Dro with respect to the extended line Ex of the inner peripheral surface 22cb of the damper seal 22c corresponding to the inner peripheral surface of the turbine casing 22. Therefore, the clearance flow CF flowing from the gap Cr between the fin 43B and the turbine casing 22 toward the axial downstream side Dad joins the main flow M without colliding with the leading end portion 53a of the shroud main body portion 53 of the vane shroud 51. Therefore, it is possible to suppress disturbance of the flow direction of the main flow M by the clearance flow CF so that the main flow flows to the back surface side of the turbine vane 26. As a result, it is possible to reduce pressure loss by suppressing the secondary flow from being generated on the back surface of the turbine vane 26.

Further, in the first embodiment, the leading edge 55 of the vane body 52 includes the receding start point 56, the radial outer end portion 57, and the leading edge curved portion 58. The clearance flow CF flowing between the fin 43B and the turbine casing 22 flows downstream in the axial direction and collides with the leading edge curved portion 58 of the turbine vane 26. The leading edge curved portion 58 receded downstream in the axial direction as it approaches the radial outer end portion 57. Therefore, the colliding position of the clearance flow CF can be shifted to the ventral side of the vane body 52 at a position close to the vane shroud 51. As a result, it is possible to suppress the secondary flow from being generated on the back surface side of the vane body 52.

Further, in the first embodiment, since the leading edge fillet portion 54a of the vane shroud 51 is located on the radial outer side Dro with respect to the clearance flow CF, it is possible to suppress the clearance flow CF from colliding with the leading edge fillet portion 54a that spreads to the axial upstream side Dru. Accordingly, it is possible to suppress the clearance flow CF from colliding with the leading edge fillet portion 54a so that a position where the clearance flow CF collides with the turbine vane 26 is shifted to the back surface side of the turbine vane 26. Thus, it is possible to suppress the generation of the secondary flow.

Second Embodiment

Next, a second embodiment of the invention will be described with reference to the drawings. The gas turbine for the aircraft of the second embodiment is different from the turbine casing 22 of the first embodiment only in that an inclined surface is provided. Therefore, the same parts as those of the first embodiment will be described by giving the same reference numerals thereto and a redundant description will be omitted.

Figure 3:
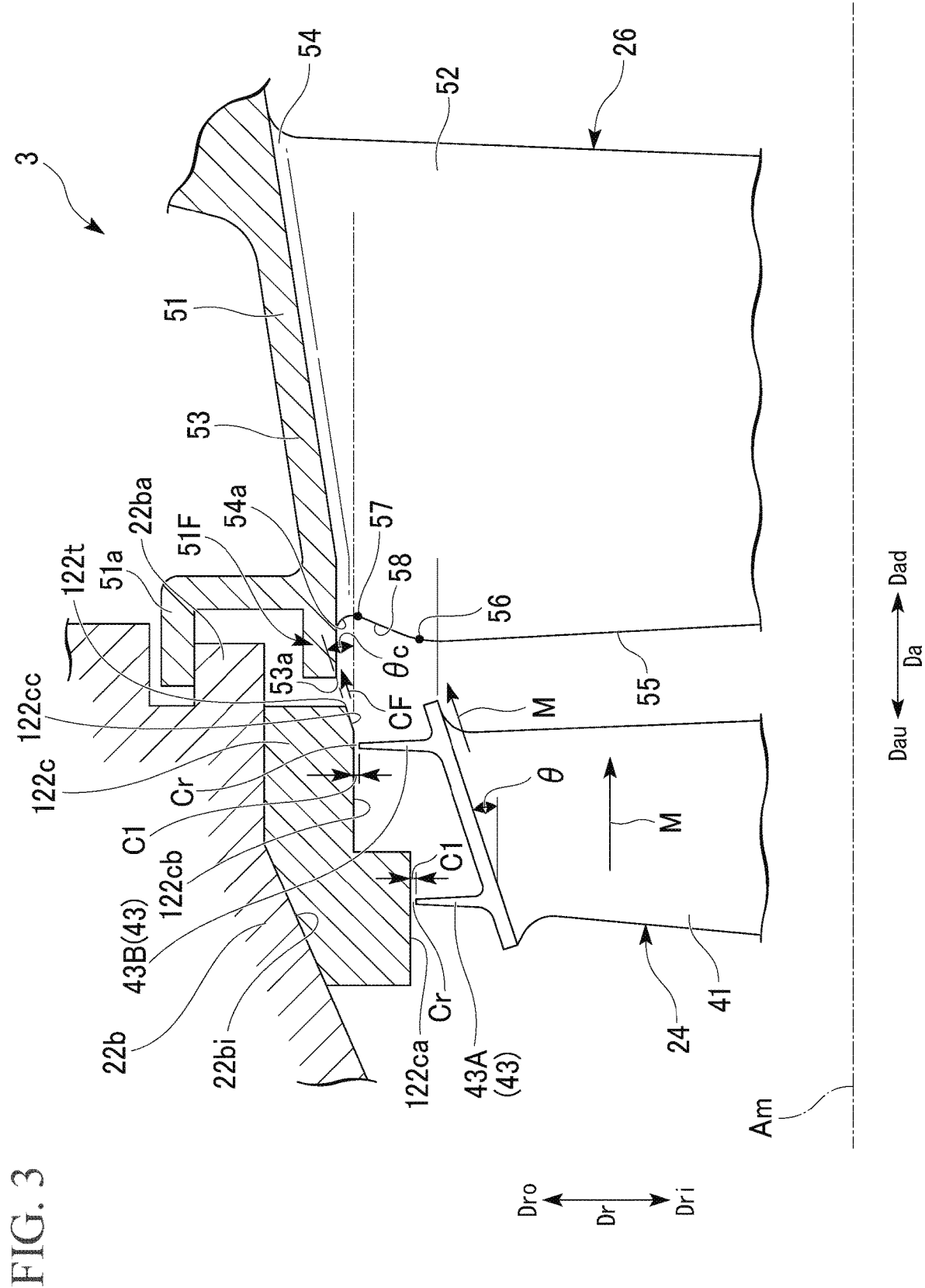
FIG. 3 is a partial cross-sectional view corresponding to FIG. 2 of a second embodiment of the invention.

FIG. 3 is a partial cross-sectional view corresponding to FIG. 2 of the second embodiment of the invention.

As shown in FIG. 3, the turbine blade 24 of the turbine 3 includes the blade body 41, the blade shroud 42, and the fin 43.

Similarly to the first embodiment, the blade shroud 42 is inclined at a predetermined flare angle θ to be disposed on the outside of the radial direction Dr as it approaches the downstream side of the main flow M with respect to the axis Am. Therefore, the main flow M flowing in the vicinity of the blade shroud 42 flows along the blade shroud 42. That is, the main flow M flows toward the radial outer side Dro as it approaches the downstream side.

The turbine casing 22 includes a casing main body (not shown), a blade ring (not shown), a heat shield ring (not shown), a split ring 22b, and a damper seal 122c.

The damper seal 122c suppresses a part of the main flow M from passing through the gap Cr formed between the fin 43A and the turbine casing 22 and between the fin 43B and the turbine casing 22. Similarly to the damper seal 22c of the first embodiment, the damper seal 122c of the second embodiment also forms a non-contact seal structure together with the fins 43A and 43B. The damper seal 122c is fixed to the inner peripheral surface 22bi of the split ring 22b. As the damper seal 122c, for example, a member having a honeycomb structure opening to the radial inner side Dri can be used. Further, an abradable seal or the like can be used as the damper seal 122c.

The damper seal 122c includes two inner peripheral surfaces 122ca and 122cb respectively facing the tip ends 43a of the fins 43A and 43B and an inclined surface 122cc.

Similarly to the inner peripheral surfaces 22ca and 22cb of the first embodiment, the inner peripheral surfaces 122ca and 122cb and the inclined surface 122cc constitute the inner peripheral surface of the turbine casing 22 at a position where the damper seal 122c is disposed. The gap Cr between the inner peripheral surface 122ca of the damper seal 122c and the fin 43A and the gap Cr between the inner peripheral surface 122cb and the fin 43 are formed as the same clearance C1.

The inclined surface 122cc is formed on the axial downstream side Dad with respect to the gap Cr between the fin 43B and the damper seal 122c. The inclined surface 122cc is inclined away from the axis Am as it approaches the axial downstream side Dad. The inclined surface 122cc reaches an edge 122t of the damper seal 122c on the axial downstream side Dad. The inclined surface 122cc has an inclination angle θc corresponding to the flare angle θ of the blade shroud 42. Here, "corresponding to the flare angle θ" means an angle within a slight angle range based on the flare angle θ in addition to the same angle as the flare angle θ. The inclined surface 122cc is formed to be continuous in the circumferential direction Dc (see FIG. 1) and is formed in a ring shape. The inclined surface 122cc of the second embodiment is formed in a shape in which a corner portion formed on the axial downstream side Dad of the damper seal 122c is chamfered.

The turbine vane 26 is fixed to the turbine casing 22 on the axial downstream side Dad of the turbine blade 24. The turbine vane 26 includes at least the vane shroud 51 and the vane body 52. The vane shroud 51 includes the shroud main body portion 53 and the fillet portion 54.

The leading end portion 51F of the vane shroud 51 on the axial upstream side Dau is disposed on the radial outer side Dro with respect to the extended line Ex of the inclined surface 122cc in a cross-section including the axis Am. In the second embodiment, both the shroud main body portion 53 and the fillet portion 54 are disposed on the radial outer side Dro with respect to the extended line Ex. The distance L2 between the blade shroud 42 and the shroud main body portion 53 of the vane shroud 51 in the radial direction Dr is larger than the sum (L1+L3) of the length L1 of the leading edge fillet portion 54a in the radial direction Dr and the distance L3 between the blade shroud 42 and the turbine casing 22 in the radial direction Dr.

Similarly to the first embodiment, in the vane body 52, the leading edge 55 of the axial upstream side Dau is provided with at least the receding start point 56, the radial outer end portion 57, and the leading edge curved portion 58. The leading edge curved portion 58 is formed to connect the receding start point 56 and the radial outer end portion 57 to each other, and has a curved shape to be arched toward the axial upstream side Dau.

According to the gas turbine for the aircraft of the second embodiment, the clearance flow CF flowing between the fin 43B and the turbine casing 22 can flow along the inclined surface 122cc. Then, the inclined surface 122cc has an inclination angle θc corresponding to the flare angle θ of the blade shroud 42. Accordingly, the flow angle of the clearance flow CF can be close to the angle of the main flow M flowing along the blade shroud 42. Therefore, it is possible to relax (in other words, decrease) an angle at which the clearance flow CF collides with the main flow M. As a result, it is possible to reduce pressure loss caused by the collision between the clearance flow CF and the main flow M.

Further, the clearance flow CF can be brought closer to the radial outer side Dro of the turbine vane 26 by the inclined surface 122cc. When the turbine vane 26 includes the leading edge curved portion 58, the leading edge 55 of the vane body 52 is located on the axial downstream side Dad as it approaches the radial outer side Dro. Therefore, the position at which the clearance flow CF collides with the vane body 52 can be shifted to the ventral side of the vane body 52. As a result, it is possible to suppress the secondary flow from being generated on the back surface side of the vane body 52.

The invention is not limited to the configurations of the above-described embodiments and can be modified in design in the scope not departing from the spirit thereof.

For example, in the first and second embodiments, a case in which the receding start point 56, the radial outer end portion 57, and the leading edge curved portion 58 are provided in the leading edge 55 of the vane body 52 on the axial upstream side Dau has been described. However, the receding start point 56, the radial outer end portion 57, and the leading edge curved portion 58 may be omitted.

Further, in the first and second embodiments, a case in which the fillet portion 54 is disposed on the radial outer side Dro with respect to the extended line Ex has been described. However, when the fillet portion 54 is small, the fillet portion 54 may be disposed on the radial inner side Dri with respect to the extended line Ex.

In the first embodiment, a case in which the vane shroud 51 is located on the radial outer side Dro with respect to the extended line Ex has been described. However, at least the leading end portion 51F of the vane shroud 51 on the axial upstream side Dau may be disposed on the radial outer side with respect to the extended line Ex. For example, the intermediate portion or the trailing end portion of the vane shroud 51 in the axial direction Da may be disposed on the radial inner side Dri with respect to the extended line Ex.

In the second embodiment, a case in which the shape of the inclined surface 122cc in the cross-sectional view of FIG. 3 is a linear shape has been described. However, the shape of the inclined surface 122cc in the cross-sectional view may be a shape in which the clearance flow CF can flow at an angle close to the flare angle θ and is not limited to a linear shape. For example, the inclined surface 122cc may be formed in a slightly curved shape in the cross-section.

INDUSTRIAL APPLICABILITY

According to the gas turbine for the aircraft, it is possible to reduce pressure loss.

REFERENCE SIGNS LIST

1 Compressor
2 Combustion chamber

3 Turbine
4 Exhaust nozzle
10 Intake duct
11 Compressor rotor
12 Compressor casing
13 Compressor blade row
14 Compressor blade
15 Compressor vane row
16 Compressor vane
21 Turbine rotor
22 Turbine casing (casing)
22b Split ring
22ba End portion
22bi Inner peripheral surface
22c, 122c Damper seal
22ca Inner peripheral surface
22cb Inner peripheral surface
23 Turbine blade row
24 Turbine blade
25 Turbine vane row
26 Turbine vane
27 Injection port
41 Blade body
41a Distal end
42 Blade shroud
42a Outer peripheral surface
43 Fin
43a Tip end
43A Fin
43B Fin
51 Vane shroud
51a Hook portion
51F Leading end portion
52 Vane body
53 Shroud main body portion
53a Leading end portion
54 Fillet portion
54a Leading edge fillet portion
55 Leading edge
56 Receding start point
57 Radial outer end portion
58 Leading edge curved portion
91 Gas turbine rotor
92 Gas turbine casing
100 Gas turbine
122c Damper seal
122ca Inner peripheral surface
122cb Inner peripheral surface
122cc Inclined surface
122t Edge

The invention claimed is:

1. A gas turbine for an aircraft comprising:
a rotor which is capable of rotating about an axis;
blades each including a blade body extending outward from the rotor in a radial direction of the rotor, a blade shroud formed on a distal end of the blade body, and a fin protruding from an outer peripheral surface of the blade shroud;
a casing surrounding the rotor and the blades so as to form gaps between the casing and the fins; and
vanes each including a vane shroud fixed to the casing at a downstream side of the blade in an axial direction of the axis, of which at least a leading end portion formed upstream in the axial direction is located outside with respect to a first extended line of an inner peripheral surface of the casing in the radial direction about the axis, and a vane body extending inward from the vane shroud in the radial direction,
wherein a leading edge of the vane body formed upstream in the axial direction includes: a receding start point; a radial outer end portion which is connected to the vane shroud and is receded downstream in the axial direction with respect to the receding start point; and a leading edge curved portion which is formed to connect the receding start point and the radial outer end portion and which is arched upstream in the axial direction, and
wherein the receding start point is located outside a rear end of an inner surface of the blade shroud in the radial direction.

2. The gas turbine for the aircraft according to claim 1, wherein the vane shroud includes: a shroud main body portion which is fixed to the casing; and a leading edge fillet portion which is formed between the shroud main body portion and the radial outer end portion of the vane body and is formed so as to be gradually spread toward at least upstream in the axial direction as it approaches the shroud main body portion, and
wherein a distance between the blade shroud and the shroud main body portion in the radial direction is larger than a sum of a length of the leading edge fillet portion in the radial direction and a distance between the blade shroud and the casing in the radial direction.

3. The gas turbine for the aircraft according to claim 1, wherein the blade shroud is installed at a flare angle so as to be separated from the axis as it approaches downstream in the axial direction,
wherein the casing includes an inclined surface which is formed downstream the gap in the axial direction and which has at an angle corresponding to the flare angle, and
wherein the leading end portion of the vane shroud formed upstream in the axial direction is located outside with respect to a second extended line of the inclined surface in the radial direction.

* * * * *